United States Patent
Yamashita et al.

[11] Patent Number: 5,980,786
[45] Date of Patent: Nov. 9, 1999

[54] METHOD FOR PRODUCING A COMPLEX OXIDE USED AS A CATHODE ACTIVE MATERIAL OF A LITHIUM SECONDARY BATTERY

[75] Inventors: Yasuhisa Yamashita; Koji Hattori, both of Shiga-ken, Japan

[73] Assignee: Murata Manufacturing Co., Ltd., Japan

[21] Appl. No.: 09/065,635

[22] Filed: Apr. 23, 1998

[30] Foreign Application Priority Data

May 8, 1997 [JP] Japan ................................. 9-118043

[51] Int. Cl.$^6$ ............................. H01B 1/08; H01B 1/14; C01B 13/20
[52] U.S. Cl. ............................. 252/518.1; 252/521.2; 252/519.21; 423/592; 423/594
[58] Field of Search ............................. 252/519.2, 519.21, 252/519.3, 521.2, 521.6, 518.1; 423/599, 592, 594; 429/86, 224; 205/594, 429; 204/280

[56] References Cited

U.S. PATENT DOCUMENTS 5,496,664  3/1996  Sterr ......................................... 429/224
5,742,070  4/1998  Hayshi .................................. 252/182.1

FOREIGN PATENT DOCUMENTS

0814524 A1  6/1997  European Pat. Off. .
0824087 A1  7/1997  European Pat. Off. .
WO 94/25398  11/1994  WIPO .

OTHER PUBLICATIONS

Takashi Ogihara, et al.; "Preparation of Spherical LIC002 Powders by the Ultrasonic Spray Decomposition and its Application to Cathode Active Material in Lithium Secondary Battery"; Journal of the Ceramic Society of Japan; International Edition; vol. 101, No. 10, Oct. 1, 1993; pp. 1128–1132.

Primary Examiner—Mark Kopec
Assistant Examiner—Derrick G. Hamlin
Attorney, Agent, or Firm—Ostrolenk, Faber, Gerb & Soffen, LLP

[57] ABSTRACT

A method for producing a cathode active material for a lithium secondary battery having a large initial capacity and excellent in the charging-discharging cycle characteristics, while restraining the generation of $NO_2$, is provided. In the production method of a cathode active material for a lithium secondary battery made up of a complex oxide containing at least lithium, after adding a material generating oxygen on spray pyrolysis, such as nitric acid, hydrogen peroxide, etc., to an aqueous or alcohol solution of the organic acid salts of metal elements constituting the complex oxide, the mixture is subjected to spray pyrolysis to form a complex oxide, and the complex oxide is heat-treated. As the complex oxides, there are a lithium manganese complex oxide, a lithium cobalt complex oxide, a lithium nickel complex oxide, etc.

20 Claims, 1 Drawing Sheet

METHOD FOR PRODUCING A COMPLEX OXIDE USED AS A CATHODE ACTIVE MATERIAL OF A LITHIUM SECONDARY BATTERY

BACKGROUND OF THE INVENTION

1. Field of the Invention

The present invention relates to a method for producing a complex oxide containing lithium, such as $LiMn_2O_4$, $LiCoO_2$, $LiNiO_2$, etc., and used for a cathode active material of a lithium secondary battery.

2. Description of the Related Art

It has been known that complex oxides such as $LiMn_2O_4$, $LiCoO_2$, $LiNiO_2$, etc., used for a cathode active material of a lithium secondary battery can be produced by a spray pyrolysis method.

In this method, the desired complex oxide can be obtained by spraying and decomposing a solution containing metal elements that constitute the complex oxide in a heated atmosphere. As the raw material containing metal elements for obtaining the solution, nitrates having a high solubility in water or an alcohol are used. In the case of obtaining, for example, $LiMn_2O_4$, a mixed solution of lithium nitrate and manganese nitrate is subjected to spray pyrolysis.

However, the conventional method using nitrates necessarily generates $NO_2$, for example, as shown by equation (1) in the case of obtaining $LiMn_2O_4$. It is a problem to treat the large amount of $NO_2$ generated during industrial mass production.

$$LiNO_3 + 2Mn(NO_3)_2 \rightarrow LiMn_2O_4 + 5NO_2 + 0.5O_2 \tag{1}$$

Thus, an object of the present invention is to solve the above-described problem and to provide a method for producing a complex oxide for use as a cathode active material of a lithium secondary battery which has a large initial capacity and is excellent in charging-discharging cycle characteristics by restraining the generation of $N_2$.

SUMMARY OF THE INVENTION

The method for producing a complex oxide comprising lithium used as a cathode active material of a lithium secondary battery comprises the steps of: providing an aqueous or alcohol solution that contains organic acid salts of metal elements constituting the complex oxide and a material generating oxygen during spray pyrolysis; decomposing the solution by a spray pyrolysis method to obtain powder of the complex oxide; and subjecting the powder of the complex oxide to a heat treatment to grow the powder into larger particles of the complex oxide.

The complex oxide preferably comprises one selected from the group consisting of a lithium manganese complex oxide, a lithium cobalt complex oxide and a lithium nickel complex oxide, and more preferably, the complex oxide is one selected from the group consisting of $LiMn_2O_4$, $LiCoO_2$ and $LiNiO_2$.

The material generating oxygen is preferably nitric acid or hydrogen peroxide, and the organic acid salt is preferably a formate.

The step of decomposing the solution is preferably performed at a temperature of at least about 400° C. and more preferably from about 500 to 900° C., and the heat treatment is preferably performed at a temperature of at least about 500° C. and more preferably from about 600 to 900° C.

DETAILED DESCRIPTION OF PREFERRED EMBODIMENTS

Figure 1:
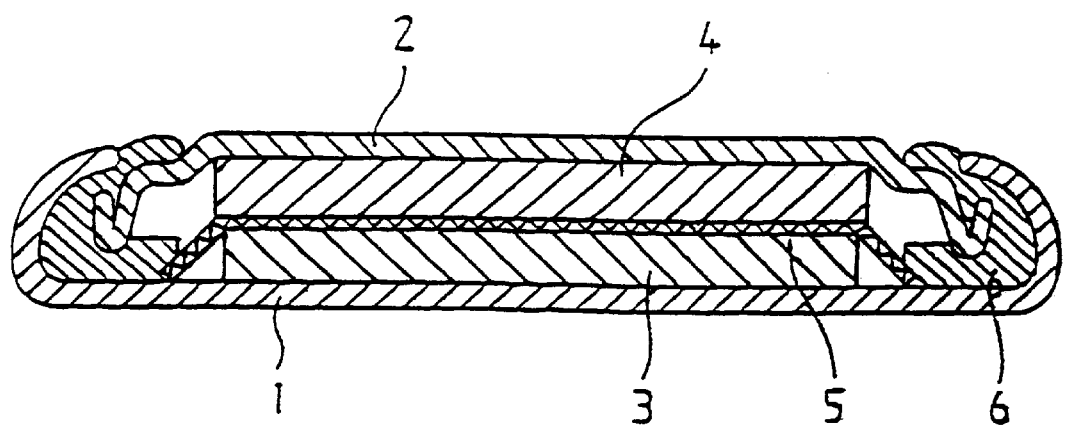
FIG. 1 is a cross-sectional view showing an example of a lithium secondary battery.

The inventors of the present invention first studied a method of using an organic acid salt which does not generate $NO_2$, such as acetates, formates, etc., in order to eliminate the necessity of treating $NO_2$. When the organic acid salts are employed, $NO_2$ is not generated as shown in equation (2).

$$CH_3COOLi + 2Mn(CH_3COO)_2 + 10.75O_2 \rightarrow LiMn_2O_4 + 10CO_2 + 7.5H_2O \tag{2}$$

However, a large amount of oxygen is consumed in treating the organic salt and as a result, the oxygen amount in the atmosphere during the spray pyrolysis is reduced. This causes the problem that the desired complex oxides cannot be synthesized as well as the problem that toxic gases such as carbon monoxide, acetaldehyde, etc. are generated. Therefore, it is necessary to introduce oxygen into the atmosphere of the spray pyrolysis unit and further to subject the toxic gases to a decomposition and/or oxidation treatment, which necessarily increases the production cost.

Furthermore, a lithium secondary battery using the cathode active material obtained by using organic acid salts as the raw material had the problem that the energy density per unit weight, that is, the capacity, becomes small compared with the case of using a cathode material obtained by using a nitrate as the raw material. This is because a lithium complex oxide having an oxygen deficiency can be formed due to the fact that the oxygen in the atmosphere of the spray pyrolysis unit becomes deficient as a result of the combustion of the organic acid salt.

In the light of the foregoing, the inventors of the present invention have found that employing organic acid salts in combination with material which releases oxygen during the spray pyrolysis prevents the deficiency of oxygen during the formation of the complex oxide and the generation of toxic gases. The material generating oxygen in the present invention is preferably an oxidizing agent and generates oxygen or oxygen ions due to oxidation reaction during the spray pyrolysis, since organic acids or any other unnecessary materials for complex oxide are oxidized so as to be easily burnt. In addition, it is preferable that the material does not include elements which have the possibility to contaminate the complex oxide. Nitric acid and hydrogen peroxide are preferable for the aforementioned reasons, but material other than nitric acid or hydrogen peroxide can be used.

According to the method of the present invention, after adding a material generating oxygen to an aqueous or alcohol solution comprising organic acid salts of metal elements constituting the complex oxide, the solution is heat-decomposed by the spray pyrolysis to form powder of the complex oxide. Thereafter, the complex oxide is heat-treated for growing the powder of the complex oxide into particles of the complex oxide.

By adding an oxygen-generating material to the solution of the organic acid salt containing the metal elements constituting the complex oxide, oxygen can be generated and supplied within droplets of the mist formed by spraying the solution. Thus, the metal elements constituting the complex oxide are oxidized under the uniform oxygen atmosphere to form a complex oxide having the uniform composition, compared to the case where no oxygen is supplied within the droplets of the mist. In addition, the oxygen deficiency resulting from burning of the organic salt during the spray pyrolysis can be complemented. Accordingly, the generation of $NO_2$ during the reaction can be restrained as compared to the case of using a nitrate, and also, a lithium complex oxide without the oxygen deficiency which occurred in the case of using an organic salt can be obtained.

Hereinafter, the preferred embodiments of the present invention are explained in more detail with reference to the drawing and tables.

EXAMPLE 1

First, lithium formate, lithium nitrate, manganese formate, and manganese nitrate were prepared as the compounds of metal elements constituting the lithium manganese complex oxide used as a cathode active material for a lithium secondary battery. Then, 1.0 mol of lithium formate or lithium nitrate and 2.0 mols of manganese formate or manganese nitrate were precisely weighed and with each of the combinations shown in Table 1 were placed in a vessel. After adding thereto either 4,950 ml of water and 50 ml of nitric acid having a concentration of 60% and a specific gravity of 1.38 or 4,900 ml of water and 100 ml of hydrogen peroxide or 5,000 ml of water only (when nitrate was used), each mixture was stirred to dissolve the salts. It is noted that the nitric acid and hydrogen peroxide are materials generating oxygen at the spray pyrolysis, that is, an oxygen-generating material.

Then, each of the mixed solutions was subjected to the spray pyrolysis by spraying it from a nozzle into a heat-pyrolysis furnace that is adjusted at a temperature of from 400 to 900° C. at a speed of 1,200 ml/hour, to obtain a powder of each complex oxide. Thereafter, each of the complex oxides obtained was placed in a sagger of alumina and heat-treated at a temperature of from 500 to 950° C. for 2 hours, to obtain each of the lithium manganese complex oxides shown in Table 1 as Sample Nos. 1 to 18. Note that in Table 1, the samples with the mark * are those of Comparative Examples outside the scope of the present invention, and others are samples within the scope of this invention.

TABLE 1

| Sample No. | Raw Material Lithium | Raw Material Manganese | Oxygen-Generating Material | Spraying Temperature (° C.) | Heat Treatment Temperature (° C.) |
|---|---|---|---|---|---|
| 1 | Lithium formate | Manganese formate | Nitric acid | 400 | 800 |
| 2 | Lithium formate | Manganese formate | $H_2O_2$ | 400 | 800 |
| 3 | Lithium formate | Manganese formate | Nitric acid | 500 | 800 |
| 4 | Lithium formate | Manganese formate | $H_2O_2$ | 500 | 800 |
| 5 | Lithium formate | Manganese formate | Nitric acid | 800 | 800 |
| 6 | Lithium formate | Manganese formate | $H_2O_2$ | 800 | 800 |
| 7 | Lithium formate | Manganese formate | Nitric acid | 900 | 800 |
| 8 | Lithium formate | Manganese formate | $H_2O_2$ | 900 | 800 |
| 9 | Lithium formate | Manganese formate | Nitric acid | 800 | 500 |
| 10 | Lithium formate | Manganese formate | $H_2O_2$ | 800 | 500 |
| 11 | Lithium formate | Manganese formate | Nitric acid | 800 | 600 |
| 12 | Lithium formate | Manganese formate | $H_2O_2$ | 800 | 600 |
| 13 | Lithium formate | Manganese formate | Nitric acid | 800 | 850 |
| 14 | Lithium formate | Manganese formate | $H_2O_2$ | 800 | 850 |
| 15 | Lithium formate | Manganese formate | Nitric acid | 800 | 950 |
| 16 | Lithium formate | Manganese formate | $H_2O_2$ | 800 | 950 |
| *17 | Lithium nitrate | Manganese nitrate | None | 800 | 800 |
| *18 | Lithium formate | Manganese formate | None | 800 | 800 |

Each complex oxide powder obtained above was photographed by a scanning electron microscope (SEM) and the particle diameter was determined from the photograph. Also, the specific area of each complex oxide was obtained by a nitrogen adsorption method. Furthermore, the complex oxides were identified by an X-ray diffraction (XRD) analysis method. The results are shown in Table 2.

TABLE 2

| Sample No. | Average Particle Size (μm) | Specific Surface Area (m²/g) | XRD Analysis Phase | Discharging Capacity (mAh/g) Beginning | Discharging Capacity (mAh/g) After 100 cycles |
|---|---|---|---|---|---|
| 1 | 1.5 | 3.1 | $LiMn_2O_4$, $Mn_2O_3$ | 83 | 60 |
| 2 | 1.6 | 3.0 | $LiMn_2O_4$, $Mn_2O_3$ | 81 | 57 |
| 3 | 1.7 | 3.2 | $LiMn_2O_4$ | 128 | 123 |
| 4 | 1.7 | 3.2 | $LiMn_2O_4$ | 127 | 120 |
| 5 | 2.3 | 3.3 | $LiMn_2O_4$ | 137 | 133 |
| 6 | 2.3 | 3.4 | $LiMn_2O_4$ | 136 | 131 |
| 7 | 2.5 | 2.7 | $LiMn_2O_4$ | 132 | 129 |
| 8 | 2.6 | 2.5 | $LiMn_2O_4$ | 130 | 128 |
| 9 | 1.9 | 17.3 | $LiMn_2O_4$ | 129 | 110 |
| 10 | 1.9 | 16.5 | $LiMn_2O_4$ | 129 | 112 |
| 11 | 2.0 | 7.2 | $LiMn_2O_4$ | 130 | 123 |
| 12 | 2.1 | 7.0 | $LiMn_2O_4$ | 131 | 121 |
| 13 | 2.2 | 2.6 | $LiMn_2O_4$ | 135 | 132 |
| 14 | 2.3 | 2.5 | $LiMn_2O_4$ | 134 | 130 |
| 15 | 2.4 | 1.2 | $LiMn_2O_4$ | 119 | 115 |
| 16 | 2.4 | 1.3 | $LiMn_2O_4$ | 117 | 114 |
| *17 | 2.4 | 3.6 | $LiMn_2O_4$ | 139 | 134 |
| *18 | 2.1 | 3.2 | $LiMn_2O_4$ | 127 | 117 |

A secondary battery was then prepared using each complex oxide obtained as the cathode active material as follows.

The above-described complex oxide powder was kneaded with polyethylene terephthalate as a binder, the mixture was shaped into a sheet, and the sheet was press-attached to a SUS mesh to provide a cathode.

Thereafter, as shown in FIG. 1, the above-described cathode 3 was stacked on an anode 4 of lithium metal via a polypropylene separator 5 such that the SUS mesh of the cathode 3 faces outward, and the stacked anode 4 and cathode 3 were held in a cathode cell 1 of stainless steel so that the cathode 3 faces downward. Separator 5 was impregnated with an electrolyte. As the electrolyte, a solution obtained by dissolving lithium perchlorate in a mixed solvent of propylene carbonate and 1,1-dimethoxyethane was used. Thereafter, the opening of the cathode cell 1 was sealed by a anode plate 2 of stainless steel with a dielectric packing member 6 being sandwiched therebetween, thereby obtaining a lithium secondary battery.

On each of the lithium secondary batteries obtained, a charging-discharging test was carried out under the conditions of a charging-discharging density of 0.5 mA/cm$^2$, a charging stop voltage of 4.3 V and a discharging stop voltage of 3.0 V. The results are shown in Table 2 above.

As is clear from the results of Table 1 and Table 2, the lithium manganese complex oxide obtained by adding the material generating oxygen during the spray pyrolysis, such as, for example, nitric acid or hydrogen peroxide, to the solution of an organic acid salt such as, for example, a formate solution, containing metal elements constituting the lithium manganese complex oxide, and thereafter heat treating the solution by spray pyrolysis can provide a lithium secondary battery having the same initial capacity as in the case of using a nitrate as the raw material and which has excellent charging-discharging cycle characteristics as is clear by the comparison between Sample Nos. 5 and 6 and Sample Nos. 17 and 18.

Furthermore, NO$_2$ generated even when using nitric acid as the oxygen-generating material is about ⅕ or less than when using a nitrate as the raw material, and becomes zero in the case of adding hydrogen peroxide. Thereby the waste gas treatment after the reaction becomes easy. Moreover, the generation of toxic gases such as carbon monoxide, acetaldehyde, etc., caused by the oxygen deficiency at pyrolysis, etc., can be prevented.

In the above-described Example, the organic acid salt was a formate, but other organic acid salts such as an acetate, etc., can be used. Of organic acid salts, a formate is most preferred because the oxygen required for the oxidative decomposition is the smallest.

Also in the above-described Example, the lithium manganese complex oxide was LiMn$_2$O$_4$, but the present invention is not limited to this, and the same effect as above can be obtained with LiMn$_2$O$_4$ wherein a part of Mn is replaced with Li, Cr, Fe, Co, Ni, Mg, Al, etc.

The practical temperature range for the spray pyrolysis is preferably from about 500 to 900° C. If the temperature is lower than about 400° C., a single phase of the lithium manganese complex oxide cannot be obtained. The upper limit is limited to a temperature lower than the temperature at which the lithium manganese complex oxide decomposes.

The practical temperature range for the heat treatment is preferably from about 600 to 900° C. At these temperatures, the lithium manganese complex oxide is grown to a particle size and a specific area suitable for the cathode active material of a lithium secondary battery, and a lithium secondary battery excellent in initial capacity and charging-discharging cycle characteristics can be obtained.

EXAMPLE 2

First, lithium formate, lithium nitrate, cobalt formate, and cobalt nitrate were prepared as the compounds of the metal elements constituting the lithium cobalt complex oxide used as a cathode active material for a lithium secondary battery. Then, 1.0 mol of lithium formate or lithium nitrate and 1.0 mol of cobalt formate or cobalt nitrate were precisely weighed and each of the combinations shown in Table 3 were placed in a vessel. After adding thereto 4,950 ml of water and 50 ml of nitric acid having a concentration of 60% and a specific gravity of 1.38, or 4,900 ml of water and 100 ml of hydrogen peroxide, or 5,000 ml of water only, each mixture was stirred to dissolve the salts. It is noted that the nitric acid and hydrogen peroxide are materials generating oxygen at the spray pyrolysis, that is, an oxygen-generating material.

Each of the mixed solutions was subjected to spray pyrolysis by spraying it from a nozzle into a heat-pyrolysis furnace adjusted at a temperature of from 400 to 900° C. at a speed of 1,200 ml/hour to obtain a powder of each complex oxide. Thereafter, each of the complex oxides obtained was placed in a sagger of alumina and heat-treated at a temperature of from 500 to 950° C. for 2 hours to obtain each of the lithium cobalt complex oxides shown in Table 3 as Sample Nos. 21 to 38. Note that in Table 3, the samples with the mark * are those of Comparative Examples outside the scope of the present invention, and others are samples within the scope of this invention.

TABLE 3

| Sample No. | Raw Material Lithium | Raw Material Cobalt | Oxygen-Generating Material | Spraying Temperature (° C.) | Heat Treatment Temperature (° C.) |
|---|---|---|---|---|---|
| 21 | Lithium formate | Cobalt formate | Nitric acid | 400 | 800 |
| 22 | Lithium formate | Cobalt formate | H$_2$O$_2$ | 400 | 800 |
| 23 | Lithium formate | Cobalt formate | Nitric acid | 500 | 800 |
| 24 | Lithium formate | Cobalt formate | H$_2$O$_2$ | 500 | 800 |
| 25 | Lithium formate | Cobalt formate | Nitric acid | 800 | 800 |
| 26 | Lithium formate | Cobalt formate | H$_2$O$_2$ | 800 | 800 |
| 27 | Lithium formate | Cobalt formate | Nitric acid | 900 | 800 |
| 28 | Lithium formate | Cobalt formate | H$_2$O$_2$ | 900 | 800 |
| 29 | Lithium formate | Cobalt formate | Nitric acid | 800 | 500 |
| 30 | Lithium formate | Cobalt formate | H$_2$O$_2$ | 800 | 500 |
| 31 | Lithium formate | Cobalt formate | Nitric acid | 800 | 600 |
| 32 | Lithium formate | Cobalt formate | H$_2$O$_2$ | 800 | 600 |
| 33 | Lithium formate | Cobalt formate | Nitric acid | 800 | 850 |
| 34 | Lithium formate | Cobalt formate | H$_2$O$_2$ | 800 | 850 |
| 35 | Lithium formate | Cobalt formate | Nitric acid | 800 | 950 |
| 36 | Lithium formate | Cobalt formate | H$_2$O$_2$ | 800 | 950 |
| *37 | Lithium nitrate | Cobalt nitrate | None | 800 | 800 |
| *38 | Lithium formate | Cobalt formate | None | 800 | 800 |

The powder of each complex oxide obtained above was photographed by a scanning electron microscope (SEM), and the particle diameter was determined from the photograph. Also, the specific area of each complex oxide was obtained by a nitrogen adsorption method. Futhermore, the complex oxide was identified by an X-ray diffraction (XRD) analysis method. The results are shown in Table 4.

TABLE 4

| Sample No. | Average Particle Size (μm) | Specific Surface Area (m²/g) | XRD Analysis Phase | Discharging Capacity (mAh/g) Beginning | After 100 cycles |
|---|---|---|---|---|---|
| 21 | 1.7 | 6.9 | $LiCoO_2$, $Co_2O_3$ | 99 | 73 |
| 22 | 1.8 | 6.5 | $LiCoO_2$, $Co_2O_3$ | 97 | 73 |
| 23 | 1.8 | 3.8 | $LiCoO_2$ | 131 | 127 |
| 24 | 1.8 | 3.9 | $LiCoO_2$ | 128 | 124 |
| 25 | 2.1 | 3.5 | $LiCoO_2$ | 139 | 134 |
| 26 | 2.3 | 3.4 | $LiCoO_2$ | 137 | 133 |
| 27 | 2.4 | 2.7 | $LiCoO_2$ | 131 | 126 |
| 28 | 2.5 | 2.6 | $LiCoO_2$ | 130 | 126 |
| 29 | 1.3 | 29.9 | $LiCoO_2$ | 130 | 108 |
| 30 | 1.3 | 30.1 | $LiCoO_2$ | 129 | 105 |
| 31 | 1.7 | 8.8 | $LiCoO_2$ | 130 | 124 |
| 32 | 1.8 | 9.0 | $LiCoO_2$ | 130 | 123 |
| 33 | 2.3 | 2.1 | $LiCoO_2$ | 136 | 133 |
| 34 | 2.3 | 2.0 | $LiCoO_2$ | 135 | 130 |
| 35 | 3.1 | 1.2 | $LiCoO_2$ | 120 | 111 |
| 36 | 3.0 | 1.0 | $LiCoO_2$ | 118 | 110 |
| *37 | 2.5 | 3.7 | $LiCoO_2$ | 140 | 135 |
| *38 | 2.1 | 3.0 | $LiCoO_2$ | 125 | 117 |

Secondary batteries were prepared by following the same procedure as in Example 1 using the each complex oxide obtained as the cathode active material.

On each of the lithium secondary batteries obtained, a charging-discharging test was performed by the same manner as in Example 1 under the conditions of a charging-discharging current density of 0.5 mA/cm², charging stop voltage of 4.3 V, and discharging stop voltage of 3.0 V. The results are shown in Table 4 above.

As is clear from the results of Table 3 and Table 4, the lithium cobalt complex oxide obtained by adding the material generating oxygen on spray pyrolysis, such as, for example, nitric acid or hydrogen peroxide, to the solution of an organic acid salt such as, for example, a formate solution, containing metal elements constituting the lithium cobalt complex oxide, and thereafter heat treating the solution by spray pyrolysis can provide the lithium secondary battery having the same initial capacity as the case of using a nitrate as the raw material and having excellent charging-discharging cycle characteristics as is clear by the comparison between Sample Nos. 25 and 26 and Sample Nos. 37 and 38.

In the above-described Example, the lithium cobalt complex oxide was $LiCoO_2$ but the present invention is not limited to this case, and when using $LiCoO_2$ wherein a part of Co is replaced with Cr, Fe, Ni, Mn, Mg, Al, etc., the same effect as above can be obtained.

The practical temperature range of the spray pyrolysis is preferably from about 500 to 900° C. If the temperature is lower than about 400° C., a single phase of the lithium cobalt complex oxide cannot be obtained. The upper limit is limited to lower than the temperature at which the lithium cobalt complex oxide formed is decomposed by heat.

The practical temperature range of the heat treatment temperature is preferably from about 600 to 900° C. At these temperatures, a lithium cobalt complex oxide grown to a particle size and a specific area suitable as the cathode active material for a lithium secondary battery is obtained, and a lithium secondary battery excellent in the initial capacity and the charging-discharging cycle characteristics can be obtained.

EXAMPLE 3

First, lithium nitrate, nickel formate, and nickel nitrate were prepared as the compounds of metal elements constituting the lithium nickel complex oxide as the cathode active material for a lithium secondary battery, lithium formate,. Then, 1.0 mol of lithium formate or lithium nitrate and 1.0 mol of nickel nitrate or nickel nitrate were precisely weighed, placed in a vessel, and after adding thereto 4,950 ml of water and 50 ml of nitric acid having a concentration of 60% and a specific gravity of 1.38 or 4,900 ml of water and 100 ml of hydrogen peroxide or 5,000 ml of water only, the mixture was stirred to dissolve the salts. The nitric acid or hydrogen peroxide is a material generating oxygen at the spray pyrolysis, that is, an oxygen-generating material.

The mixed solution was then subjected to spray pyrolysis by spraying the solution from a nozzle into a heat-pyrolysis furnace adjusted at a temperature of from 400 to 900° C. at a speed of 1,200 ml/hour to obtain the powder of each complex oxide. Thereafter, each of the complex oxides obtained was placed in a sagger of alumina and heat-treated at a temperature of from 500 to 900° C. for 2 hours, whereby the lithium nickel complex oxides shown by Sample Nos. 41 to 58 in Table 5 were obtained. In Table 5, the samples with the mark * are those of Comparative Examples outside the scope of the present invention, and other samples are within the scope of the present invention.

TABLE 5

| Sample No. | Raw Material Lithium | Nickel | Oxygen-Generating Material | Spraying Temperature (° C.) | Heat Treatment Temperature (° C.) |
|---|---|---|---|---|---|
| 41 | Lithium formate | Nickel formate | Nitric acid | 400 | 750 |
| 42 | Lithium formate | Nickel formate | $H_2O_2$ | 400 | 750 |
| 43 | Lithium formate | Nickel formate | Nitric acid | 500 | 750 |
| 44 | Lithium formate | Nickel formate | $H_2O_2$ | 500 | 750 |
| 45 | Lithium formate | Nickel formate | Nitric acid | 800 | 750 |
| 46 | Lithium formate | Nickel formate | $H_2O_2$ | 800 | 750 |
| 47 | Lithium formate | Nickel formate | Nitric acid | 900 | 750 |
| 48 | Lithium formate | Nickel formate | $H_2O_2$ | 900 | 750 |
| 49 | Lithium formate | Nickel formate | Nitric acid | 800 | 500 |
| 50 | Lithium formate | Nickel formate | $H_2O_2$ | 800 | 500 |
| 51 | Lithium formate | Nickel formate | Nitric acid | 800 | 600 |
| 52 | Lithium formate | Nickel formate | $H_2O_2$ | 800 | 600 |
| 53 | Lithium formate | Nickel formate | Nitric acid | 800 | 850 |
| 54 | Lithium formate | Nickel formate | $H_2O_2$ | 800 | 850 |
| 55 | Lithium formate | Nickel formate | Nitric acid | 800 | 900 |
| 56 | Lithium formate | Nickel formate | $H_2O_2$ | 800 | 900 |
| *57 | Lithium nitrate | Nickel nitrate | None | 800 | 750 |
| *58 | Lithium formate | Nickel formate | None | 800 | 750 |

Each complex oxide powder obtained as described above was photographed by a scanning-type electron microscope (SEM), and from the photograph, the particle sizes were obtained. Also, the specific area of each complex oxide was determined by a nitrogen adsorption method. Furthermore, each complex oxide was identified by an X-ray diffraction (XRD) analysis method. The results are shown in Table 6.

TABLE 6

| Sample No. | Average Particle Size ($\mu$m) | Specific Surface Area ($m^2/g$) | XRD Analysis Phase | Discharging Capacity (mAh/g) | |
|---|---|---|---|---|---|
| | | | | Beginning | After 100 cycles |
| 41 | 1.7 | 5.8 | $LiNiO_2$, $Ni_2O_3$ | 108 | 68 |
| 42 | 1.6 | 5.9 | $LiNiO_2$, $Ni_2O_3$ | 102 | 59 |
| 43 | 1.7 | 4.9 | $LiNiO_2$ | 164 | 152 |
| 44 | 1.7 | 5.1 | $LiNiO_2$ | 161 | 151 |
| 45 | 2.0 | 4.0 | $LiNiO_2$ | 176 | 171 |
| 46 | 1.9 | 4.2 | $LiNiO_2$ | 176 | 170 |
| 47 | 2.4 | 2.6 | $LiNiO_2$ | 170 | 165 |
| 48 | 2.4 | 2.5 | $LiNiO_2$ | 168 | 161 |
| 49 | 1.9 | 27.3 | $LiNiO_2$ | 167 | 121 |
| 50 | 1.8 | 28.5 | $LiNiO_2$ | 167 | 119 |
| 51 | 2.0 | 9.8 | $LiNiO_2$ | 172 | 164 |
| 52 | 2.1 | 9.6 | $LiNiO_2$ | 170 | 161 |
| 53 | 3.1 | 0.9 | $LiNiO_2$ | 141 | 127 |
| 54 | 3.0 | 0.9 | $LiNiO_2$ | 137 | 120 |
| 55 | 3.2 | 0.8 | $LiNiO_2$ | 138 | 123 |
| 56 | 3.1 | 0.8 | $LiNiO_2$ | 134 | 120 |
| *57 | 2.2 | 4.1 | $LiNiO_2$ | 177 | 172 |
| *58 | 1.9 | 3.6 | $LiNiO_2$ | 154 | 143 |

Secondary battery were prepared following Example 1 using each complex oxide obtained as the cathode material.

On the lithium secondary batteries obtained, a charging-discharging test was performed as in Example 1 under the conditions of a charging-discharging current density of 0.5 mA/$cm^2$, charging stop voltage of 4.3 V, and discharging stop voltage of 3.0 V. The results are shown in Table 6 above.

From the results of Table 5 and Table 6, the lithium nickel complex oxide obtained by adding a material generating oxygen on spray pyrolysis, such as, for example, nitric acid or hydrogen peroxide, to a solution of an organic acid salt such as a solution of a formate containing metal elements constituting the lithium nickel complex oxide, and heat treating the solution by spray heat-decomposing can provide a lithium secondary battery having the same initial capacity as the case of using a nitrate as the raw material and being excellent in charging-discharging cycle characteristics as is clear by the comparison between Sample Nos. 45 and 46 with Sample Nos. 57 and 58.

In the above-described Example, the lithium nickel complex oxide is $LiNiO_2$ but the invention of the present application is not limited to this case since with a lithium nickel complex oxide wherein a part of Ni of $LiNiO_2$ is replaced with Cr, Fe, Co, Mn, Mg, Al, etc., the same effect can be obtained.

The practical temperature range of the spray pyrolysis is preferably from about 500 to 900° C. When the temperature is lower than about 400° C., a single phase of the lithium nickel complex oxide cannot be obtained. The upper limit is limited to a temperature lower than the temperature at which the lithium nickel complex oxide formed is decomposed by heat.

The practical temperature range of the heat treatment temperature is preferably from about 600 to 900° C. In the heat treatment, a lithium nickel complex oxide is grown to a particle sizes and a specific area suitable for the cathode active material of a lithium secondary battery is obtained, and a lithium secondary battery excellent in initial capacity and charging-discharging cycle characteristics can be obtained.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method for producing a complex oxide comprising lithium for use as a cathode active material of a lithium secondary battery, comprising the steps of:

providing an aqueous or alcohol solution of organic acid salts of metal elements constituting the complex oxide, and a material generating oxygen during spray pyrolysis, the material being an oxidizing agent which generates oxygen or oxygen ions due to an oxidation reaction during the spray pyrolysis; and decomposing the solution by spray pyrolysis to obtain a powder of the complex oxide.

2. A method according to claim 1, wherein the complex oxide powder is subjected to a heat treatment to grow the powder into larger particles of the complex oxide.

3. A method according to claim 2, wherein the complex oxide is selected from the group consisting of lithium manganese complex oxide, lithium cobalt complex oxide and lithium nickel complex oxide.

4. A method according to claim 3, wherein the material generating oxygen is nitric acid or hydrogen peroxide.

5. A method according to claim 4, wherein the step of decomposing the solution is performed at a temperature of at least about 400° C.

6. A method according to claim 5, wherein the step of decomposing the solution is performed at a temperature of about 500 to 900° C.

7. A method according to claim 6, wherein the heat treatment is performed at a temperature of at least about 500° C.

8. A method according to claim 7, wherein the heat treatment is performed at a temperature of from about 600 to 900° C.

9. A method according to claim 8, wherein the organic acid salt is a formate.

10. A method according to claim 9, wherein the complex oxide is selected from the group consisting of $LiMn_2O_4$, $LiCoO_2$ and $LiNiO_2$.

11. A method according to claim 2, wherein the organic acid salt is a formate.

12. A method according to claim 10, wherein the material generating oxygen is nitric acid or hydrogen peroxide.

13. A method according to claim 12, wherein the step of decomposing the solution is performed at a temperature of at least about 400° C. and the heat treatment is performed at a temperature of at least about 500° C.

14. A method according to claim 13, wherein the step of decomposing the solution is performed at a temperature of about 500 to 900° C. and the heat treatment is performed at a temperature of from about 600 to 900° C.

15. A method according to claim 2, wherein the material generating oxygen is nitric acid or hydrogen peroxide.

16. A method according to claim 1, wherein the organic acid salt is a formate.

17. A method according to claim 16, wherein the material generating oxygen is nitric acid or hydrogen peroxide.

18. A method according to claim 1, wherein the material generating oxygen is nitric acid or hydrogen peroxide.

19. A method according to claim 18, the step of decomposing the solution is performed at a temperature of at least about 400° C.

20. A method according to claim 19, the step of decomposing the solution is performed at a temperature of about 500 to 900° C.

* * * * *